United States Patent
Wu

(10) Patent No.: US 8,361,631 B2
(45) Date of Patent: Jan. 29, 2013

(54) POLYMER BLEND CONTAINING INTERMEDIATE TRANSFER MEMBERS

(75) Inventor: Jin Wu, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 349 days.

(21) Appl. No.: 12/869,078

(22) Filed: Aug. 26, 2010

(65) Prior Publication Data

US 2012/0049121 A1 Mar. 1, 2012

(51) Int. Cl.
*B32B 5/16* (2006.01)
*B32B 15/04* (2006.01)
*B32B 15/08* (2006.01)
*B32B 27/00* (2006.01)
*B32B 27/08* (2006.01)
*G03G 15/20* (2006.01)

(52) U.S. Cl. ........ 428/500; 428/323; 428/421; 428/457; 428/458; 428/461; 428/515; 399/308

(58) Field of Classification Search .......................... None
See application file for complete search history.

(56) References Cited

U.S. PATENT DOCUMENTS

| | | | |
|---|---|---|---|
| 5,487,707 A | 1/1996 | Sharf et al. | |
| 6,318,223 B1 | 11/2001 | Yu et al. | |
| 6,440,515 B1 | 8/2002 | Thornton et al. | |
| 6,602,156 B2 | 8/2003 | Schlueter, Jr. | |
| 6,716,562 B2 * | 4/2004 | Uehara et al. | 430/125.3 |
| 7,031,647 B2 | 4/2006 | Mishra et al. | |
| 7,130,569 B2 | 10/2006 | Goodman et al. | |
| 7,139,519 B2 | 11/2006 | Darcy, III et al. | |
| 2009/0297232 A1 | 12/2009 | Wu | |
| 2010/0051171 A1 | 3/2010 | Wu et al. | |
| 2010/0055328 A1 | 3/2010 | Wu et al. | |

OTHER PUBLICATIONS

U.S. Appl. No. 12/413,645, filed Mar. 30, 2009.
U.S. Appl. No. 12/413,638, filed Mar. 30, 2009.
U.S. Appl. No. 12/413,651, filed Mar. 30, 2009.
U.S. Appl. No. 12/413,633, filed Mar. 30, 2009.
U.S. Appl. No. 12/413,642, filed Mar. 30, 2009.
U.S. Appl. No. 12/550,589, filed Aug. 31, 2009.
U.S. Appl. No. 12/749,539, filed Mar. 30, 2010.
U.S. Appl. No. 12/749,547, filed Mar. 30, 2010.

* cited by examiner

Primary Examiner — Sheeba Ahmed

(74) Attorney, Agent, or Firm — Eugene O. Palazzo

(57) ABSTRACT

An intermediate transfer media, such as a belt, that includes a polymer blend of a polymethacrylimide and a polysulfone, a polymethacrylimide and a polyphenylsulfone, or a polymethacrylimide and a polyethersulfone and optionally a conductive component.

27 Claims, No Drawings

POLYMER BLEND CONTAINING INTERMEDIATE TRANSFER MEMBERS

CROSS REFERENCES TO PENDING APPLICATIONS

Copending U.S. application Ser. No. 12/749,539, filed Mar. 30, 2010, entitled Fluoropolyimide Single Layered Intermediate Transfer Members, the disclosure of which is totally incorporated herein by reference, illustrates for example, an intermediate transfer member comprised of a fluoropolyimide and a conductive component such as a carbon black.

Copending U.S. application Ser. No. 12/749,539, filed Mar. 30, 2010 entitled Fluoropolyimide Intermediate Transfer Members, the disclosure of which is totally incorporated herein by reference, illustrates for example, an intermediate transfer member comprised of a polyimide substrate, and thereover a fluoropolyimide.

Copending U.S. application Ser. No. 12/550,589, filed Aug. 31, 2009 entitled Carbon Black Polymeric Intermediate Transfer Members, illustrates for example, an intermediate transfer member comprised of a mixture of carbon black, a first copolymer comprised of a polyester, a polycarbonate and a polyalkylene glycol, and a second polymer.

Copending U.S. application Ser. No. 12/413,645, filed Mar. 30, 2009 entitled Layered Intermediate Transfer Members, illustrates for example, an intermediate transfer member comprised of a polyimide substrate, and thereover a polyetherimide/polysiloxane.

Copending U.S. application Ser. No. 12/413,638, filed Mar. 30, 2009, entitled Perfluoropolyether Polymer Grafted Polyaniline Containing Intermediate Transfer Members, illustrates for example, an intermediate transfer member comprised of a substrate and in contact with the substrate a polyaniline grafted perfluoropolyether phosphoric acid polymer.

Copending U.S. application Ser. No. 12/413,651, filed Mar. 30, 2009, entitled Polyimide Polysiloxane Intermediate Transfer Members, illustrates for example, an intermediate transfer member comprised of at least one of a polyimide/polyetherimide/polysiloxane, and a polyimide polysiloxane.

Illustrated in U.S. application Ser. No. 12/129,995, U.S. Publication No. 20090297232, filed May 30, 2008, entitled Polyimide Intermediate Transfer Components, the disclosure of which is totally incorporated herein by reference, is for example, an intermediate transfer belt comprised of a substrate comprising a polyimide and a conductive component wherein the polyimide is cured at a temperature of, for example, from about 175 to about 290° C. over a period of time of for example, from about 10 to about 120 minutes.

Illustrated in U.S. application Ser. No. 12/200,147 entitled Coated Seamed Transfer Member, filed Aug. 28, 2008, is a process which for example, comprises providing a flexible belt having a welded seam extending from one parallel edge to the other parallel edge, the welded seam having a rough seam region comprising an overlap of two opposite edges; contacting the rough seam region with a heat and pressure applying tool; and smoothing out the rough seam region with heat and pressure applied by the heat and pressure applying tool to produce a flexible belt having a smooth welded seam, and subsequently coating the seam with a crosslinked acrylic resin.

Copending U.S. application Ser. No. 12/749,547, filed Mar. 30, 2010, the disclosure of which is totally incorporated herein by reference, illustrates for example, an intermediate transfer member comprised of cyclo olefin polymer of for example, a polymer of a dicyclopentadiene, or a copolymer of ethylene and norbornene.

Copending U.S. application Ser. No. 12/413,633 filed Mar. 30, 2009, the disclosure of which is totally incorporated herein by reference, entitled Fluorinated Sulfonic Acid Polymer Grafted Polyaniline Containing Intermediate Transfer Members, illustrates an intermediate transfer member comprised of a substrate, and in contact therewith a polyaniline having grafted thereto a fluorinated sulfonic acid polymer.

Copending U.S. application Ser. No. 12/413,642 filed Mar. 30, 2009, entitled Fluorotelomer Grafted Polyaniline Containing Intermediate Transfer Members, illustrates an intermediate transfer member comprised of a substrate, and a layer comprised of polyaniline having grafted thereto a fluorotelomer.

Illustrated in U.S. application Ser. No. 12/129,995, U.S. Publication No. 20090297232, filed May 30, 2008, entitled Polyimide Intermediate Transfer Components, the disclosure of which is totally incorporated herein by reference, is an intermediate transfer belt comprised of a substrate comprising a polyimide and a conductive component wherein the polyimide is cured at a temperature of from about 175 to about 290° C. over a period of time of for example, from about 10 to about 120 minutes.

Illustrated in U.S. application Ser. No. 12/200,147 filed Aug. 28, 2008, entitled Coated Seamed Transfer Member, the disclosure of which is totally incorporated herein by reference, is a process which comprises providing a flexible belt having a welded seam extending from one parallel edge to the other parallel edge, the welded seam having a rough seam region comprising an overlap of two opposite edges; contacting the rough seam region with a heat and pressure applying tool; and smoothing out the rough seam region with heat and pressure applied by the heat and pressure applying tool to produce a flexible belt having a smooth welded seam, and subsequently coating the seam with a crosslinked acrylic resin.

Illustrated in U.S. application Ser. No. 12/200,179 filed Aug. 28, 2008, entitled Coated Transfer Member, the disclosure of which is totally incorporated herein by reference, is a process which comprises providing a flexible belt having a welded seam extending from one parallel edge to the other parallel edge, the welded seam having a rough seam region comprising an overlap of two opposite edges; contacting the rough seam region with a heat and pressure applying tool; and smoothing out the rough seam region with heat and pressure applied by the heat and pressure applying tool to produce a flexible belt having a smooth welded seam, and subsequently coating the belt with a crosslinked acrylic resin.

In embodiments of the present disclosure a number of components and processes of the cross-referenced copending applications can be selected, such as for example the components of the supporting substrates, the adhesive layer, and the conductive additives and the processes for the formation of intermediate transfer members.

BACKGROUND

Disclosed are intermediate transfer members, and more specifically, intermediate transfer members selected for the transfer of developed images in for example, an electrostatographic, for example xerographic, including digital, image on image, and the like, machines or apparatuses, and printers, inclusive of office printers, production printers, and the like. In embodiments, there are selected intermediate transfer members comprised of a polymer blend of a polymethacrylimide (PMMI) and a polysulfone (PSU), a polymethacrylimide and a polyphenylsulfone (PPSU), or a polymethacrylimide and a polyethersulfone (PESU), which individual polymers are commercially available. In embodiments thereof, the polymer blend of a polymethacrylimide and a polysulfone, a polymethacrylimide and a polyphenylsulfone, or a polymethacrylimide and a polyethersulfone are dispersed in or mixed with a conductive component such as a carbon black and a suitable solvent, such as N-methylpyrrolidinone (NMP), N,N'-dimethylformamide (DMF), or N,N'-dimethylacetaimide (DMAc), and subsequently the resulting dispersion is subjected to known casting methods, to form the intermediate transfer member. Also, in embodiments, the polymer blend of a polymethacrylimide and a polysulfone, a polymethacrylimide and a polyphenylsulfone, or a polymethacrylimide and a polyethersulfone together with a carbon black are extruded by a known extrusion device to form the intermediate transfer members or the intermediate transfer members can be generated by known solution casting processes.

A number of advantages are associated with the intermediate transfer members, such as belts (ITB) of the present disclosure such as excellent toner transfer efficiency, for example from about 90 to about 95 percent of the developed image can be transferred from the ITB to a substrate, like paper; functional resistivity, excellent modulus, and excellent break strength; an acceptable thermal expansion coefficient (CTE) and an acceptable hygroscopic expansion coefficient (CHE); wear and abrasion resistance; and low and acceptable surface friction characteristics for aiding in the transfer of developed xerographic images.

In electrostatographic printing machines wherein the toner image is electrostatically transferred by a potential difference between the imaging member and the intermediate transfer member, the transfer of the toner particles to the intermediate transfer member and the retention thereof should be substantially complete so that the image ultimately transferred to the image receiving substrate will have a high resolution. Substantially about 100 percent toner transfer occurs when most or all of the toner particles comprising the image are transferred, and little residual toner remains on the surface from which the image was transferred.

Intermediate transfer members may possess a number of advantages, such as enabling high throughput at modest process speeds; improving registration of the final color toner image in color systems using synchronous development of one or more component colors and using one or more transfer stations; and increasing the number of substrates that can be selected. However, a disadvantage of using an intermediate transfer member is that a plurality of transfer operations is usually needed allowing for the possibility of charge exchange occurring between toner particles and the transfer member which ultimately can lead to less than complete toner transfer, resulting in low resolution images on the image receiving substrate, and image deterioration. When the image is in color, the image can additionally suffer from color shifting and color deterioration.

In a typical electrostatographic reproducing apparatus, such as xerographic copiers, printers, multifunctional machines, and the like a light image of an original to be copied is recorded in the form of an electrostatic latent image upon a photosensitive member or a photoconductor, and the latent image is subsequently rendered visible by the application of electroscopic thermoplastic resin particles and colorant. Generally, the electrostatic latent image is developed by contacting it with a developer mixture comprised of carrier granules having toner particles adhering triboelectrically thereto, or a liquid developer material, which may include a liquid carrier having toner particles dispersed therein. The developer mixture is advanced into contact with the electrostatic latent image, and the toner particles are deposited thereon in image configuration. Subsequently, the developed image is transferred to a document, such as paper and fixed or fused for example heat and pressure. It is advantageous in some instances to transfer the developed image to a intermediate transfer web, belt or component, and subsequently, transfer with a high, for example about 90 to about 100, transfer efficiency the developed image from the intermediate transfer member to a substrate, like paper, cardboard, transparencies, and the like.

It has been reported in several U.S. patents that intermediate transfer members enable acceptable registration of the final color toner image in color systems using synchronous development of one or more component colors, and using one or more transfer stations; and all for an increase the number of substrates that can be selected. However, a disadvantage of using an intermediate transfer member is that a plurality of developed toner transfer operations is utilized thus causing charge exchange between the toner particles and the transfer member, which ultimately can cause less than complete toner transfer, resulting in low resolution images on the image receiving substrate, like paper, and image deterioration. When the image is in color, the image can additionally suffer from color shifting and color deterioration.

In embodiments, it is desired to provide an intermediate transfer member, which has excellent transfer capabilities, for example, as compared to an intermediate transfer member where a polymer blend of a polymethacrylimide and a polysulfone, a polymethacrylimide and a polyphenylsulfone, or a polymethacrylimide and a polyethersulfone is absent; and possesses excellent release properties from a metal substrate permitting manufacturing simplicity. It is also desired to provide a weldable intermediate transfer belt that may not, but could, have puzzle cut seams, and instead, has a weldable seam, thereby providing a belt that can be manufactured without labor intensive steps, such as manually piecing together the puzzle cut seam with fingers, and without the lengthy high temperature and high humidity conditioning steps. It is also desired to provide an intermediate transfer member, which has excellent wear and abrasion resistance, and more specifically, has excellent mechanical properties as compared, for example, to an intermediate transfer member where a polymer blend of a polymethacrylimide and a polysulfone, a polymethacrylimide and a polyphenylsulfone, or a polymethacrylimide and a polyethersulfone are absent.

REFERENCES

Illustrated in U.S. Pat. No. 7,031,647 is an imageable seamed belt containing a lignin sulfonic acid doped polyaniline.

Illustrated in U.S. Pat. No. 7,139,519 is an intermediate transfer belt, comprising a belt substrate comprising primarily at least one polyimide polymer; and a welded seam.

Illustrated in U.S. Pat. No. 7,130,569 is a weldable intermediate transfer belt comprising a substrate comprising a homogeneous composition comprising a polyaniline in an amount of, for example, from about 2 to about 25 percent by weight of total solids, and a thermoplastic polyimide present in an amount of from about 75 to about 98 percent by weight of total solids, wherein the polyaniline has a particle size of, for example, from about 0.5 to about 5 microns.

Puzzle cut seam members are disclosed in U.S. Pat. Nos. 5,487,707; 6,318,223, and 6,440,515.

Illustrated in U.S. Pat. No. 6,602,156 is a polyaniline filled polyimide puzzle cut seamed belt, however, the manufacture of a puzzle cut seamed belt is labor intensive and costly, and the puzzle cut seam, in embodiments, is sometimes weak. The manufacturing process for a puzzle cut seamed belt usually involves a lengthy in time high temperature and high humidity conditioning step. For the conditioning step, each individual belt is rough cut, rolled up, and placed in a conditioning chamber that is environmentally controlled at about 45° C. and about 85 percent relative humidity, for approximately 20 hours. To prevent or minimize condensation and watermarks, the puzzle cut seamed transfer belt resulting is permitted to remain in the conditioning chamber for a suitable period of time, such as 3 hours. The conditioning of the transfer belt renders it difficult to automate the manufacturing thereof, and the absence of such conditioning may adversely impact the belts electrical properties, which in turn results in poor image quality.

It is known that carbon black can be used as the conductive particles in several intermediate transfer belts; however, carbon black can be difficult to disperse since there are very few polar groups on the surface, and unless they are specially modified on the surface. Also, it can be difficult to generate carbon black based ITBs with consistent resistivity because the required loading is present on the vertical part of the percolation curve and the working window for carbon black is very narrow, and is difficult for a robust manufacturing process. In addition, in humid environments, moisture will tend to deposit on the ITB during idle and cause wrinkles induced transfer failures and print defects.

SUMMARY

In embodiments, there is disclosed an intermediate transfer member comprised of a substrate comprising a polymer blend of a polymethacrylimide and a polysulfone, a polymethacrylimide and a polyphenylsulfone, or a polymethacrylimide and a polyethersulfone; an intermediate transfer member, such as an intermediate belt comprised of a supporting substrate such as a polyimide, and a layer thereover comprising a polymer blend of a polymethacrylimide and a polysulfone, a polymethacrylimide and a polyphenylsulfone, or a polymethacrylimide and a polyethersulfone; and an intermediate transfer member wherein the resistivity thereof is from about $10^8$ to about $10^{13}$ ohm/square, from about $10^9$ to about $10^{12}$ ohm/square, and more specifically, from about $10^{10}$ to about $10^{11}$ ohm/square as measured by a High Resistivity meter.

In addition, the present disclosure provides, in embodiments, an apparatus for forming images on a recording medium comprising a charge retentive surface with an electrostatic latent image thereon, a development component to apply toner to the charge retentive surface to develop the electrostatic latent image and transferring the developed image to the intermediate transfer member illustrated herein; a weldable intermediate belt comprised of a polymer blend of a polymethacrylimide and a polysulfone, a polymethacrylimide and a polyphenylsulfone, or a polymethacrylimide and a polyethersulfone, which belt functions to transfer the developed xerographic image from the charge retentive surface like a photoconductor to a substrate like paper, and fixing the transferred image by heat and pressure.

EMBODIMENTS

Aspects of the present disclosure relate to an intermediate transfer member comprised of a polymer blend selected from the group consisting of a polymethacrylimide and a polysulfone, a polymethacrylimide and a polyphenylsulfone, and a polymethacrylimide, and a polyethersulfone; an intermediate transfer member comprised of a polymer mixture of a polymethacrylimide and a polysulfone, and which mixture includes therein a conductive component; an intermediate transfer member comprised of a mixture of a polymethacrylimide, a polyphenylsulfone, and a conductive component, or a mixture of a polymethacrylimide, a polyethersulfone, and a conductive component; a xerographic apparatus transfer member comprised of a polymer mixture of a polymethacrylimide and a polysulfone, a polymethacrylimide and a polyphenylsulfone, or a polymethacrylimide and a polyethersulfone and in embodiments mixtures thereof; an intermediate transfer member comprised of a supporting substrate first layer, and a polymer mixture of a polymethacrylimide and a polysulfone, a polymethacrylimide and a polyphenylsulfone, or a polymethacrylimide and a polyethersulfone second layer present on and in full contact, such as for example, 100 percent contact, with the first layer; an intermediate transfer belt comprised of a supporting conductive substrate first layer, and a second layer present on the first layer, and wherein the second layer is selected from the group consisting of a mixture of a polymethacrylimide and a polysulfone, a mixture of a polymethacrylimide and a polyphenylsulfone, or a mixture of a polymethacrylimide and a polyethersulfone and which second layer also includes therein a conductive component; an intermediate transfer member comprised of a mixture of a conductive material like carbon black, a metal oxide, or mixtures thereof and a thermoplastic polymer mixture of a polymethacrylimide and a polysulfone, a thermoplastic mixture of a polymethacrylimide and a polyphenylsulfone, or a thermoplastic mixture of a polymethacrylimide and a polyethersulfone, an adhesive layer situated between the supporting substrate and the second layer, and a release top layer in contact with the polymer blend or mixture of a polymethacrylimide and a polysulfone, a polymethacrylimide and a polyphenylsulfone, or a polymethacrylimide and a polyethersulfone in the form of a layer; a transfer media comprised of a polymer blend of a polymethacrylimide and a polysulfone, a polymethacrylimide and a polyphenylsulfone, or a polymethacrylimide and a polyethersulfone; an intermediate transfer member wherein the ratio of the polymethacrylimide to the polysulfone is from about 1/99 to about 30/70; an intermediate transfer member wherein the ratio of the polymethacrylimide to the polyphenylsulfone is from about 1/99 to about 30/70; an intermediate transfer wherein the ratio of the polymethacrylimide to the polyphenylsulfone is from about 1/99 to about 30/70; an intermediate transfer member wherein the conductive component is present in an amount of from about 1 to about 60 weight percent, and wherein the polymer blend of a polymethacrylimide and a polysulfone, a polymethacrylimide and a polyphenylsulfone is present in an amount of from about 40 to about 99 weight percent, and wherein the total of the components is about 100 percent; an intermediate transfer member wherein the ratio of the polymethacrylimide to the polysulfone is about 10/90; an intermediate transfer member where the polymethylacrylimide is (poly(N-methyl methacrylimide), with a number average molecular weight of from about 75,000 to about 125,000 and with a weight average molecular weight of from about 325,000 to about 375,000; an intermediate transfer member where the polysulfone has a number average molecular weight of from about 6,000 to about 12,000 and a weight average molecular weight of from about 25,000 to about 35,000; an intermediate transfer member where the polyphenylsulfone has a number average molecular weight of from about 9,000 to about 12,000 and a weight average molecular weight of from about 33,000 to about 39,000, and an intermediate transfer member where the polyethersulfone has a number average molecular weight of from about 12,000 to about 18,000 and a weight average molecular weight of from about 45,000 to about 55,000; and a xerographic apparatus for forming images on a recording medium comprising forming an electrostatic image on a charge retentive surface like a photoconductor, a development component to apply toner to the charge retentive surface to form a developed xerographic image on the charge retentive surface and transferring the developed image to an intermediate transfer member disclosed herein and comprised of a supporting substrate like a conductive, such as aluminum, or non conductive material like a polymer, and a layer thereover comprising a polymer blend of a polymethacrylimide and a polysulfone, a polymethacrylimide and a polyphenylsulfone, or a polymethacrylimide and a polyethersulfone, and an optional conductive component such as carbon black; followed by transfer of the developed image to a substrate like paper, cardboard, and the like, and fixing or fusing the developed image with heat, pressure, or heat and pressure.

POLYMER BLEND EXAMPLES

Examples of polymethacrylimides selected for the transfer members disclosed herein, and present for example, in an amount of from about 1 to about 30 weight percent, or from about 5 to about 20 weight percent of the polymer blend, are homopolymers of N-alkyl methacrylimide represented by

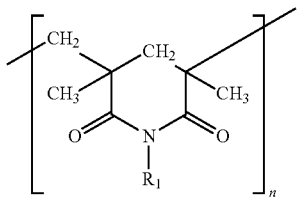

or copolymers of N-alkyl methacrylimide and alkyl/aryl methacrylate represented by

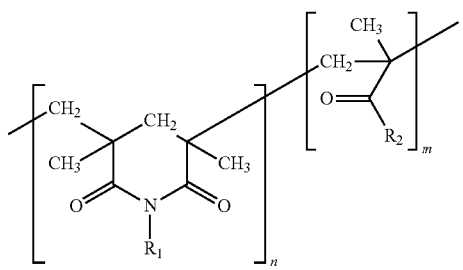

where n and m represents the number of the repeating units, and n is for example from about 50 to about 5,000, from about 500 to about 3,500, from about 700 to about 2,000, from about 1,000 to about 2,500, or from about 200 to about 2,000, and m is from about 20 to about 10,000, from about 500 to about 5,000, from 800 to about 4,000, or from about 1,500 to about 3,500; $R_1$ is an alkyl with for example, from about 1 to about 20 carbon atoms, from about 1 to about 12, or from 1 to about 6 carbon atoms; $R_2$ is alkyl with for example, from about 1 to about 20 carbon atoms, from 1 to about 6 carbon atoms or from about 1 to about 4 carbon atoms, or an aryl with for example, from about 6 to about 24 carbon atoms, from 6 to about 18, or from 6 to about 12 carbon atoms; and where the number average molecular weight of polymethacrylimide copolymer is as illustrated herein and is for example, from about 20,000 to about 500,000, and with a weight average molecular weight of the polymethacrylimide is for example, from about 50,000 to about 1,000,000.

Specific examples of homopolymers of N-alkyl methacrylimide, present in an amount of for example, from about 1 to about 30 weight percent, or from about 5 to about 20 weight percent of the polymer blend components, include poly(N-methyl methacrylimide) (PMMI) are represented by

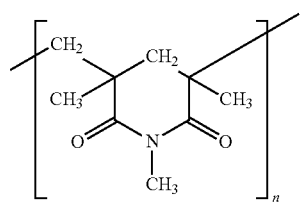

wherein n is for example from about 50 to about 5,000, from about 500 to about 3,500, from about 700 to about 2,000, from about 1,000 to about 2,500, or from about 200 to about 2,000; poly(N-ethyl methacrylimide), poly(N-propyl methacrylimide), poly(N-isoproryl methacrylimide), poly(N-butyl methacrylimide), poly(N-isobutyl methacrylimide) and the like and mixtures thereof; PLEXIMID® TT70, all obtainable from Evonik Industries, Germany. The number average molecular weight of the homopolymer of N-alkyl methacrylimide is for example, from about 20,000 to about 500,000, or from about 50,000 to about 300,000, and the weight average molecular weight of polymethacrylimide is from about 50,000 to about 1,000,000, or from about 200,000 to about 750,000 as measured by Gel Permeation Chromatography (GPC).

Specific examples of copolymers of N-alkyl methacrylimide and alkyl/aryl methacrylate include a copolymer of N-methyl methacrylimide and methyl methacrylate as represented by

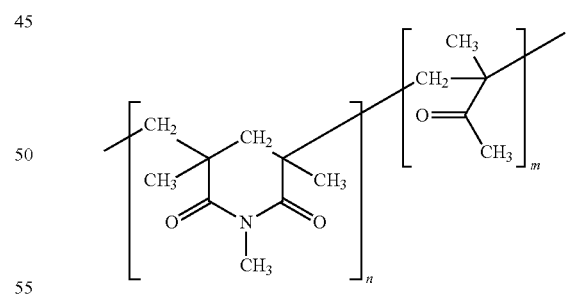

where n and m represents the number of the repeating units, and n is for example from about 50 to about 5,000, from about 500 to about 3,500, from about 700 to about 2,000, from about 1,000 to about 2,500, or from about 200 to about 2,000, and m is from about 20 to about 10,000, from about 500 to about 5,000, from 800 to about 4,000, or from about 1,500 to about 3,500; and a copolymer of N-methyl methacrylimide and ethyl methacrylate, a copolymer of N-methyl methacrylimide and n-propyl methacrylate, a copolymer of N-methyl methacrylimide and isopropyl methacrylate, a copolymer of N-methyl methacrylimide and n-butyl methacrylate, a copolymer of N-methyl methacrylimide and isobutyl methacrylate, a copolymer of N-methyl methacrylimide and phenyl methacrylate, a copolymer of N-ethyl methacrylimide and methyl methacrylate, a copolymer of N-ethyl methacrylimide and ethyl methacrylate, and the like and mixtures thereof. The number average molecular weight of the copolymer of N-alkyl methacrylimide and alkyl/aryl methacrylate is for example, from about 20,000 to about 500,000, or from about 50,000 to about 300,000, and the weight average molecular weight of the polymethacrylimide is for example from about 50,000 to about 1,000,000, or from about 200,000 to about 750,000 as measured by Gel Permeation Chromatography (GPC).

Polysulfones, polyphenylsulfones and polyethersulfones selected for the intermediate transfer member disclosed herein are represented in embodiments for by for example

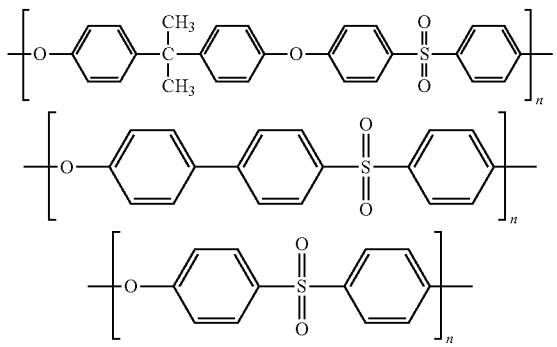

where n represents the number of repeating units, and more specifically where n is for example, a number of from about 30 to about 5,000, from about 80 to about 3,500, from about 150 to about 3,000, and yet more specifically from about 200 to about 2,000. Commercially obtainable polysulfone examples include UDEL® P-1700, P-3500; commercially obtainable polyphenylsulfone examples include RADEL® 5000NT, 5100NT15, 5900NT; commercially obtainable polyethersulfone examples include RADEL® A-200A, AG-210NT, AG-320NT, VERADEL® 3000P, 3100P, 3200P, all available or obtainable from Solvay Advanced Polymers, LLC, Alpharetta, Ga. In an embodiment the number average molecular weight of each of the polysulfone, the polyphenylsulfone and the polyethersulfone is for example, from about 2,000 to about 50,000, or from about 4,000 to about 20,000, and the weight average molecular weight of the polysulfones, the polyphenylsulfones and the polyethersulfones are for example from about 10,000 to about 200,000, or from about 50,000 to about 150,000.

Various amounts of the polymer blend of a polymethacrylimide and a polysulfone, a polymethacrylimide and a polyphenylsulfone, or a polymethacrylimide and a polyethersulfone can be selected for the solution casting or for the extrusion process preparation of the ITM, expressed in polymethacrylimide to polysulfone, polyphenylsulfone or polyethersulfone, ratios of from about 1199 to about 30/70, and from about 5/95 to about 20/80, and when a conductive component is present such as for example, carbon black, the ratio examples are about 10/85/5, about 10/80/10, or about 10/75/15.

A specific example of the polymer mixture or blend selected for the intermediate transfer member illustrated herein is the poly(N-methyl methacrylimide) (PMMI) TT70 obtainable from Evonik Inductries, and the polysulfone UDEL® P-1700 obtainable from Solvay Advanced Polymers and which blend further includes a conductive component, like carbon black, where the ratio of the poly(N-methyl methacrylimide) to the polysulfone to the carbon black is 10/85/5.

A specific example of a polymer mixture or blend selected for the intermediate transfer member illustrated herein comprises the poly(N-methyl methacrylimide) (PMMI) TT70 obtainable from Evonik Inductries, and the polyphenylsulfone RADEL® 5000NT obtainable from Solvay Advanced Polymers and which blend further includes a conductive component, like carbon black, where the ratio of the poly(N-methyl methacrylimide) to the polysulfone to the carbon black is about 10/85/5.

A specific example of a polymer mixture or blend selected for the intermediate transfer member illustrated herein comprises the poly(N-methyl methacrylimide) (PMMI) TT70 obtainable from Evonik Inductries, and the polyethersulfone VERADEL® 3000P obtainable from Solvay Advanced Polymers and which blend further includes a conductive component, like carbon black, where the ratio of the poly(N-methyl methacrylimide) to the polysulfone to the carbon black is about 10/85/5.

LAYER EXAMPLES

Specific examples of supporting substrates for the intermediate transfer members disclosed herein include polyimides, polyamideimides, polyetherimides, and mixtures thereof.

More specifically, examples of the intermediate transfer member supporting substrates of a thickness, for example, of from 10 to about 300 microns, from 50 to about 150 microns, from 75 to about 125 microns, are polyimides inclusive of known low temperature, and rapidly cured polyimide polymers, such as VTEC™ PI 1388, 080-051, 851, 302, 203, 201, and PETI-5, all available from Richard Blaine International, Incorporated, Reading, Pa. These thermosetting polyimides can be cured at temperatures of from about 180 to about 260° C. over a short period of time, such as from about 10 to about 120 minutes, or from about 20 to about 60 minutes; possess a number average molecular weight of from about 5,000 to about 500,000, or from about 10,000 to about 100,000, and a weight average molecular weight of from about 50,000 to about 5,000,000, or from about 100,000 to about 1,000,000. Also, for the supporting substrate there can be selected thermosetting polyimides that can cured at temperatures of above 300° C., such as PYRE M.L® RC-5019, RC 5057, RC-5069, RC-5097, RC-5053, and RK-692, all commercially available from Industrial Summit Technology Corporation, Parlin, N.J.; RP-46 and RP-50, both commercially available from Unitech LLC, Hampton, Va.; DURIMIDE® 100, commercially available from FUJIFILM Electronic Materials U.S.A., Inc., North Kingstown, R.I.; and KAPTON® HN, VN and FN, all commercially available from E.I. DuPont, Wilmington, Del.

Examples of polyamideimides that can be utilized as supporting substrates are VYLOMAX® HR-11NN (15 weight percent solution in N-methylpyrrolidone, $T_g$=300° C., and $M_w$=45,000), HR-12N2 (30 weight percent solution in N-methylpyrrolidone/xylene/methyl ethyl ketone=50/35/15, $T_g$=255° C., and $M_w$=8,000), HR-13NX (30 weight percent solution in N-methylpyrrolidone/xylene=67/33, $T_g$=280° C., and $M_w$=10,000), HR-15ET (25 weight percent solution in ethanol/toluene=50/50, $T_g$=260° C., and $M_w$=10,000), HR-16NN (14 weight percent solution in N-methylpyrrolidone, $T_g$=320° C., and $M_w$=100,000), all commercially available from Toyobo Company of Japan, and TORLON®AI-10

($T_g$=272° C.), commercially available from Solvay Advanced Polymers, LLC, Alpharetta, Ga.

Examples of polyetherimide supporting substrates are ULTEM® 1000 ($T_g$=210° C.), 1010 ($T_g$=217° C.), 1100 ($T_g$=217° C.), 1285, 2100 ($T_g$=217° C.), 2200 ($T_g$=217° C.), 2210 ($T_9$=217° C.), 2212 ($T_g$=217° C.), 2300 ($T_g$=217° C.), 2310 ($T_g$=217° C.), 2312 ($T_g$=217° C.), 2313 ($T_g$=217° C.), 2400 ($T_g$=217° C.), 2410 ($T_g$=217° C.), 3451 ($T_g$=217° C.), 3452 ($T_g$=217° C.), 4000 ($T_g$=217° C.), 4001 ($T_g$=217° C.), 4002 ($T_g$=217° C.), 4211 ($T_g$=217° C.), 8015, 9011 ($T_g$=217° C.), 9075, and 9076, all commercially available from Sabic Innovative Plastics.

Also, polyimides that may be selected as the supporting substrate may be prepared as fully imidized polymers which do not contain any "amic" acid, and do not require high temperature cure to convert them to the imide form. A typical polyimide of this type may be prepared by reacting di-(2,3-dicarboxyphenyl)-ether dianhydride with 5-amino-1-(p-aminophenyl)-1,3,3-trimethylindane. This polymer is available as Polyimide XU 218 sold by Ciba-Geigy Corporation, Ardsley, N.Y. Other fully imidized polyimides are available from Lenzing Corporation in Dallas, Tex., and are sold as Lenzing P83 polyimide, and by Mitsui Toatsu Chemicals, New York, N.Y. sold as Larc-TPI.

Examples of specific selected thermoplastic polyimide supporting substrates are KAPTON® KJ, commercially available from E.I. DuPont, Wilmington, Del., as represented by

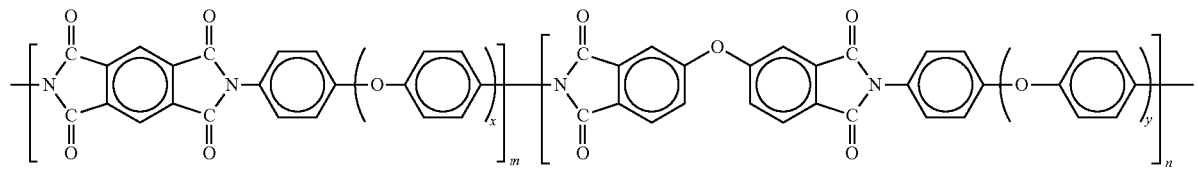

wherein x is equal to 2; y is equal to 2; m and n are from about 10 to about 300; and IMIDEX®, commercially available from West Lake Plastic Company, as represented by

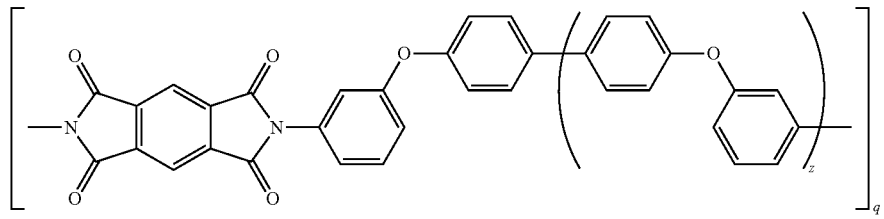

wherein z is equal to 1, and q is from about 10 to about 300.

In embodiments, the polymer blend of a polymethacrylimide and a polysulfone, a polymethacrylimide and a polyphenylsulfone, or a polymethacrylimide and a polyethersulfone can be mixed/milled with a conductive component, like carbon black and a solvent, such as N-methylpyrrolidinone (NMP), N,N'-dimethylformamide (DMF) or N,N'-dimethylacetamide (DMAc), and then the resulting dispersion mixture can be applied to or coated on a biaxially oriented poly(ethylene naphthalate) (PEN) substrate (KALEDEX™ 2000) having a known thickness of, for example, about 3.5 mils or a stainless steel sheet using known draw bar coating methods. The resulting film or films can be dried at high temperatures, in an oven, such as from about 80 to about 240° C., or from about 120 to about 190° C. for a sufficient period of time, such as for example, from about 10 to about 120 minutes, or from about 20 to about 60 minutes while remaining on the PEN or stainless steel substrate. After drying and cooling to room temperature, about 23° C., to about 25° C., the film or films on the stainless steel substrate are automatically released with no aid from tools, from the substrate resulting in the functional intermediate transfer member or members as disclosed herein.

Conductive components, such as a carbon black, a polyaniline or a metal oxide, may be present in the intermediate transfer member supporting substrate, and in the polymer blend of a polymethacrylimide and a polysulfone, a polymethacrylimide and a polyphenylsulfone, or a polymethacrylimide and a polyethersulfone layer in, example, an amount of from about 1 or about 3 to about 60 weight percent, from about 5 to about 40 weight percent, or specifically from about 10 to about 30 weight percent.

Carbon black surface groups can be formed by oxidation with an acid or with ozone, and where there is absorbed or chemisorbed oxygen groups from, for example, carboxylates, phenols, and the like. The carbon surface is essentially inert to most organic reaction chemistry except primarily for oxidative processes and free radical reactions.

The conductivity of carbon black is dependent on surface area and its structure primarily. Generally, the higher the surface area and the higher the structure, the more conductive is the carbon black. Surface area is measured by the B.E.T. nitrogen surface area per unit weight of carbon black, and is the measurement of the primary particle size. Structure is a complex property that refers to the morphology of the primary aggregates of carbon black. It is a measure of both the number of primary particles comprising primary aggregates, and the manner in which they are "fused" together. High structure carbon blacks are characterized by aggregates comprised of many primary particles with considerable "branching" and "chaining", while low structure carbon blacks are characterized by compact aggregates comprised of fewer primary particles. Structure is measured by dibutyl phthalate (DBP) absorption by the voids within carbon blacks. The higher the structure, the more the voids, and the higher the DBP absorption.

Examples of carbon blacks selected as the conductive component for the ITM include VULCAN® carbon blacks, REGAL® carbon blacks, MONARCH® carbon blacks and BLACK PEARLS® carbon blacks available from Cabot Corporation. Specific examples of conductive carbon blacks are BLACK PEARLS® 1000 (B.E.T. surface area=343 m$^2$/g, DBP absorption=1.05 ml/g), BLACK PEARLS® 880 (B.E.T. surface area=240 m$^2$/g, DBP absorption=1.06 ml/g), BLACK PEARLS® 800 (B.E.T. surface area=230 m$^2$/g, DBP absorption=0.68 ml/g), BLACK PEARLS® L (B.E.T. surface area=138 m$^2$/g, DBP absorption=0.61 ml/g), BLACK PEARLS® 570 (B.E.T. surface area=110 m$^2$/g, DBP absorption=1.14 ml/g), BLACK PEARLS® 170 (B.E.T. surface area=35 m$^2$/g, DBP absorption=1.22 ml/g), VULCAN® XC72 (B.E.T. surface area=254 m$^2$/g, DBP absorption=1.76 ml/g), VULCAN® XC72R (fluffy form of VULCAN® XC72), VULCAN® XC605, VULCAN® XC305, REGAL® 660 (B.E.T. surface area=112 m$^2$/g, DBP absorption=0.59 ml/g), REGAL® 400 (B.E.T. surface area=96 m$^2$/g, DBP absorption=0.69 ml/g), REGAL® 330 (B.E.T. surface area=94 m$^2$/g, DBP absorption=0.71 ml/g), MONARCH® 880 (B.E.T. surface area=220 m$^2$/g, DBP absorption=1.05 ml/g, primary particle diameter=16 nanometers), and MONARCH® 1000 (B.E.T. surface area=343 m$^2$/g, DBP absorption=1.05 ml/g, primary particle diameter=16 nanometers); Channel carbon blacks available from Evonik-Degussa; Special Black 4 (B.E.T. surface area=180 m$^2$/g, DBP absorption=1.8 ml/g, primary particle diameter=25 nanometers), Special Black 5 (B.E.T. surface area=240 m$^2$/g, DBP absorption=1.41 ml/g, primary particle diameter=20 nanometers), Color Black FW1 (B.E.T. surface area=320 m$^2$/g, DBP absorption=2.89 ml/g, primary particle diameter=13 nanometers), Color Black FW2 (B.E.T. surface area=460 m$^2$/g, DBP absorption=4.82 ml/g, primary particle diameter=13 nanometers), and Color Black FW200 (B.E.T. surface area=460 m$^2$/g, DBP absorption=4.6 ml/g, primary particle diameter=13 nanometers).

In embodiments, the polyaniline conductive component selected has a relatively small particle size of, for example, from about 0.5 to about 5 microns, from about 1.1 to about 2.3 microns, from about 1.2 to about 2 microns, from about 1.5 to about 1.9 microns, or about 1.7 microns. Specific examples of polyanilines selected are PANIPOL™ F, commercially available from Panipol Oy, Finland; and known lignosulfonic acid grafted polyanilines.

Examples of metal oxides selected as a conductive component for the disclosed intermediate transfer members include tin oxide, antimony doped tin oxide, indium oxide, indium tin oxide, zinc oxide, and titanium oxide, present in an amount of for example, from about 5 to about 40 weight percent, or from about 10 to about 30 weight percent of the intermediate transfer member.

The disclosed intermediate transfer members are, in embodiments, weldable, that is the seam of the member, like a belt, is weldable, and more specifically, may be ultrasonically welded to produce a seam. The surface resistivity of the disclosed intermediate transfer member is, for example, from about $10^9$ to about $10^{13}$ ohm/square, or from about $10^{10}$ to about $10^{12}$ ohm/square. The sheet resistivity of the intermediate transfer weldable member is, for example, from about $10^9$ to about $10^{13}$ ohm/square, or from about $10^{10}$ to about $10^{12}$ ohm/square as measured by a High Resistivity Meter.

The circumference of the intermediate transfer member, especially as it is applicable to a film or a belt configuration, is, for example, from about 250 to about 2,500 millimeters, from about 1,500 to about 2,500 millimeters, or from about 2,000 to about 2,200 millimeters with a corresponding width of, for example, from about 100 to about 1,000 millimeters, from about 200 to about 500 millimeters, or from about 300 to about 400 millimeters.

The intermediate transfer members illustrated herein, like intermediate transfer belts, can be selected for a number of printing and copying systems, inclusive of xerographic printing. For example, the disclosed intermediate transfer members can be incorporated into a multi-imaging system where each image being transferred is formed on the imaging or photoconductive drum at an image forming station, wherein each of these images is then developed at a developing station, and transferred to the intermediate transfer member. The images may be formed on the photoconductor and developed sequentially, and then transferred to the intermediate transfer member. In an alternative method, each image may be formed on the photoconductor or photoreceptor drum, developed, and transferred in registration to the intermediate transfer member. In an embodiment, the multi-image system is a color copying system, wherein each color of an image being copied is formed on the photoreceptor drum, developed, and transferred to the intermediate transfer member.

After the toner latent image has been transferred from the photoreceptor drum to the intermediate transfer member, the intermediate transfer member may be contacted under heat and pressure with an image receiving substrate such as paper. The toner image on the intermediate transfer member is then transferred and fixed, in image configuration, to the substrate such as paper.

The intermediate transfer member present in the imaging systems illustrated herein, and other known imaging and printing systems, may be in the configuration of a sheet, a web, a belt, including an endless belt, an endless seamed flexible belt, and an endless seamed flexible belt; a roller, a film, a foil, a strip, a coil, a cylinder, a drum, an endless strip, and a circular disc. The intermediate transfer member can be comprised of a single layer, or can be comprised of several layers, such as from about 2 to about 5 layers. In embodiments, the intermediate transfer member further includes an outer release layer.

Optional release layer examples situated on and in contact with the polymer blend of for example, a polymethacrylimide and a polysulfone, a polymethacrylimide and a polyphenylsulfone, or a polymethacrylimide and a polyethersulfone include low surface energy materials with a water contact angle of greater than 90°, such as TEFLON®-like materials including fluorinated ethylene propylene copolymer (FEP), polytetrafluoroethylene (PTFE), polyfluoroalkoxy polytetrafluoroethylene (PFA TEFLON®) and other TEFLON®-like materials; silicone materials such as fluorosilicones, and silicone rubbers, such as Silicone Rubber 552, available from Sampson Coatings, Richmond, Va. (polydimethyl siloxane/dibutyl tin diacetate, 0.45 gram DBTDA per 100 grams polydimethyl siloxane rubber mixture, with a molecular weight $M_w$ of approximately 3,500); and fluoroelastomers, such as those sold as VITON®, such as copolymers and terpolymers of vinylidenefluoride, hexafluoropropylene, and tetrafluoroethylene, which are known commercially under various designations as VITON A®, VITON E®, VITON E60C®, VITON E45®, VITON E430®, VITON B910®, VITON GH®, VITON B50®, VITON E45®, and VITON GF®. The VITON® designation is a Trademark of E.I. DuPont de Nemours, Inc. Two known fluoroelastomers are comprised of (1) a class of copolymers of vinylidenefluoride, hexafluoropropylene, and tetrafluoroethylene, known commercially as VITON A®; (2) a class of terpolymers of vinylidenefluoride, hexafluoropropylene, and tetrafluoroethylene, known commercially as VITON B®; and (3) a class of tetrapolymers of vinylidenefluoride, hexafluoropropylene, tetrafluoroethylene, and a cure site monomer, such as VITON GE®, having 35 mole percent of vinylidenefluoride, 34 mole percent of hexafluoropropylene, and 29 mole percent of tetrafluoroethylene with 2 percent cure site monomer. The cure site monomer can be those available from E.I. DuPont de Nemours, Inc. such as 4-bromoperfluorobutene-1,1,1-dihydro-4-bromoperfluorobutene-1,3-bromoperfluoropropene-1,1,1-dihydro-3-bromoperfluoropropene-1, or any other suitable, known, commercially available cure site monomers.

The release layer or layers of from about 1 to about 100 microns, or from about 10 to about 50 microns may be deposited on the polymer blend of a polymethacrylimide and a polysulfone, a polymethacrylimide and a polyphenylsulfone, or a polymethacrylimide and a polyethersulfone by well known coating processes. Known methods for forming the outer layer(s) on the substrate film, such as dipping, spraying such as by multiple spray applications of very thin films, casting, flow-coating, web-coating, roll-coating, extrusion, molding, or the like, can be used. Usually it is desirable to deposit the layers by spraying such as by multiple spray applications of thin films, casting, by web coating, by flow-coating and specifically by laminating.

Adhesive layer components usually situated between the supporting substrate, and the polymer blend of a polymethacrylimide and a polysulfone, a polymethacrylimide and a polyphenylsulfone, or a polymethacrylimide and a polyethersulfone thereover include, for example, a number of resins or polymers of epoxy, urethane, silicone, polyester, and the like. Generally, the adhesive layer is a solventless layer, that is materials that are liquid at room temperature (about 25° C.), and are able to crosslink to an elastic, or rigid film to adhere at least two materials together. Specific adhesive layer components include 100 percent solids adhesives including polyurethane adhesives obtained from Lord Corporation, Erie, Pa., such as TYCEL®7924 (viscosity from about 1,400 to about 2,000 cps), TYCEL® 7975 (viscosity from about 1,200 to about 1,600 cps), and TYCEL® 7276. The viscosity range of the adhesives is, for example, from about 1,200 to about 2,000 cps. The solventless adhesives can be activated with either heat, room temperature curing, moisture curing, ultraviolet radiation, infrared radiation, electron beam curing, or any other known technique. The thickness of the adhesive layer is usually less than about 100 nanometers, and more specifically, for example, from about 1 to about 100 nanometers, from about 5 to about 75 nanometers, or from about 50 to about 100 nanometers.

Throughout the disclosure and claims, the phrase "from about to about" includes all values therebetween, thus from about 1 to about 50 includes all numbers in between 1 and 50 like 1 to 10, 10 to 20, 20 to 30, 30 to 40, and 40 to 50, and more specifically, for example, 1 to 10 includes at least 1, 2, 3, 4, 5, 6, 7, 8, 9, and 10.

Specific embodiments of the disclosed intermediate transfer members, such as belts are provided in the Examples that follow These examples are intended to be illustrative, and are not limited to the materials, conditions, or process parameters set forth in these embodiments. All parts are percentages by weight of total solids unless otherwise indicated.

Example I

A poly(N-methyl methacrylimide)/polysulfone (PMMI/PSU) blend intermediate transfer belt (ITB) was prepared as follows.

Five grams or 1 weight percent of Color Black FW1 (B.E.T. surface area of 320 $m^2/g$, DBP absorption of 2.89 ml/g, primary particle diameter of 13 nanometers), as obtained from Evonik-Degussa, was mixed by rolling for ten hours with 10 grams or 2 weight percent of a poly(N-methyl methacrylimide) or PMMI, PLEXIMID® TT70 ($M_n$=100,000 and $M_w$=350,000), as obtained from Evonik-Degussa, 85 grams or 17 weight percent of the polysulfone (PSU), UDEL® P-1700 ($M_n$=9,000 and $M_w$=30,000), as obtained from Solvay Advanced Polymers, and 400 grams or 80 weight percent of the solvent, NMP. By milling the resulting mixture with 2 millimeter stainless shot in an Attritor for 1 hour, a uniform dispersion was obtained. The resulting dispersion was then coated on a stainless steel substrate using a draw bar coating method and subsequently, dried at 125° C. for 20 minutes, and then at 190° C. for an additional 40 minutes while remaining on the substrate and where a film formed on the substrate.

The dried film automatically, that is with no tools and without hand rubbing released from the substrate, resulting in an about 100 micron thick intermediate transfer member where the ratio of the PMMI/PSU/carbon black was 10/85/5. This film can then be coated on a supporting substrate as illustrated herein.

Example II

The process of Example I was repeated except there was selected as the blend resin mixture poly(N-methyl methacrylimide) and a polyphenylsulfone (PPSU), RADEL® R-5000NT ($M_n$=11,000 and $M_w$=36,000), as obtained from Solvay Advanced Polymers. The dried film obtained automatically released from the steel substrate, and an about 100 micron thick intermediate transfer member resulted where the ratio of the PMMI/PPSU/carbon black was 10/85/5.

Example III

The process of Example I is repeated except there is selected as the blend resin mixture poly(N-methyl methacrylimide) and the polyethersulfone or PESU, VERADEL® 3000P ($M_n$=15,000 and $M_w$=50,000), as obtained from Solvay Advanced Polymers. The formed dried film is believed to automatically release from the substrate, and an about 100 micron thick intermediate transfer member results where the ratio of the PMMI/PESU/carbon black is 10/85/5.

Surface Resistivity Measurements

The above transfer member belt members of Examples I and II were measured for surface resistivity (averaging four to six measurements at varying spots, 72° F./65 percent room humidity) using a High Resistivity Meter (Hiresta-Up MCP-HT450 available from Mitsubishi Chemical Corp.).

The surface resistivity of the Example I ITB was about $6.3 \times 10^9$ ohm/square, and the surface resistivity of the Example II ITB was about $1.6 \times 10^{10}$ ohm/square, all within the functional range of an ITB of from about $10^9$ to about $10^{13}$ ohm/square.

Young's Modulus Measurement

The above ITB members of Examples I and II were measured for Young's modulus (the higher the modulus values, the stronger or more robust is the ITB; the modulus may range from about 1,000 to about 10,000 MPa for a number of ITB applications) following the ASTM D882-97 process. ITB samples (0.5 inch×12 inch) were separately placed in the measurement apparatus, the Instron Tensile Tester, and then the samples were elongated at a constant pull rate until breaking. During this time, the instrument recorded the resulting load versus sample elongation. The modulus was calculated by taking any point tangential to the initial linear portion of the aforementioned curve and dividing the tensile stress by the corresponding strain. The tensile stress was calculated by dividing the load by the average cross sectional area of the test specimen or sample ITB.

The Young's modulus of the Example I ITB was measured to be about 2,400 MPa (Mega Pascal), and the Young's modulus of the Example II ITB was measured to be about 3,200 MPa, within the reported modulus range of the a number of known thermoplastic ITBs of from about 1,000 to about 3,500 MPa, such as ITBs of a polyester/carbon black ITB with a Young's modulus of about 1,200 MPa, a polyamide/carbon black ITB with a Young's modulus of about 1,100 MPa), and a polyimide/polyaniline ITB with a Young's modulus of about 3,500 MPa).

When compared with a polysulfone or a polyphenylsulfone ITB member, the disclosed polysulfone/PMMI blend ITB (Example I) or polyphenylsulfone/PMMI blend ITB (Example II) was readily released from the stainless steel substrate in about 4 seconds. The blend ITB permits an about 20% lower manufacturing cost since there is no need to coat an extra thin release layer on the steel substrate before applying the ITB coating. The above comparative polysulfone/carbon black did not release from the stainless steel during visual observation for 30 days at which time the visual observation was ceased.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. An intermediate transfer member comprised of a polymer blend selected from the group consisting of a polymethacrylimide and a polysulfone, a polymethacrylimide and a polyphenylsulfone, and a polymethacrylimide, and a polyethersulfone.

2. An intermediate transfer member in accordance with claim 1 wherein said polymer blend is comprised of a polymethacrylimide and a polysulfone.

3. An intermediate transfer member in accordance with claim 1 wherein said polymer blend is comprised of a polymethacrylimide and a polyphenylsulfone.

4. An intermediate transfer member in accordance with claim 1 wherein said polymer blend is comprised of a polymethacrylimide and a polyethersulfone.

5. An intermediate transfer member in accordance with claim 1 wherein said polymer blend is deposited on a metal substrate.

6. An intermediate transfer member in accordance with claim 1 wherein said polymethacrylimide is a homopolymer of a N-alkyl methacrylimide represented by wherein n is from about 50 to about 5,000:

or wherein said polymethacrylimide is a copolymer of N-alkyl methacrylimide and alkyl/aryl methacrylate represented by

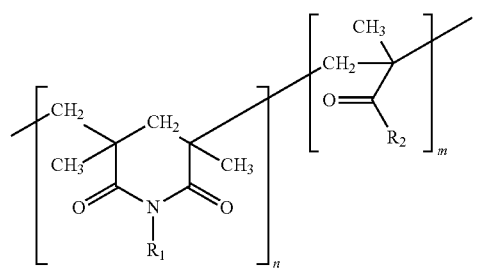

wherein n and m represents the number of the repeating units, and where n is from about 50 to about 5,000, and m is from about 20 to about 10,000; $R_1$ is alkyl with from about 1 to about 20 carbon atoms; $R_2$ is alkyl with from about 1 to about 20 carbon atoms, or aryl with from about 6 to about 24 carbon atoms.

7. An intermediate transfer member in accordance with claim 6 wherein n is from about 200 to about 2,000, and m is from about 500 to about 5,000; $R_1$ is alkyl with from about 1 to about 4 carbon atoms; $R_2$ is alkyl with from about 1 to about 4 carbon atoms, or phenyl.

8. An intermediate transfer member in accordance with claim 1 wherein said polymethacrylimide is poly(N-methyl methacrylimide).

9. An intermediate transfer member in accordance with claim 1 wherein said polymethacrylimide is a homopolymer of a N-alkyl methacrylimide selected from the group consisting of poly(N-methyl methacrylimide), poly(N-ethyl methacrylimide), poly(N-propyl methacrylimide), poly(N-isopropyl methacrylimide), poly(N-butyl methacrylimide), poly(N-isobutyl methacrylimide), and mixtures thereof.

10. An intermediate transfer member in accordance with claim 1 wherein said polymethacrylimide is a copolymer of N-alkyl methacrylimide and an alkyl/aryl methacrylate selected from the group consisting of a copolymer of N-methyl methacrylimide and methyl methacrylate, a copolymer of N-methyl methacrylimide and ethyl methacrylate, a copolymer of N-methyl methacrylimide and n-propyl methacrylate, a copolymer of N-methyl methacrylimide and isopropyl methacrylate, a copolymer of N-methyl methacrylimide and n-butyl methacrylate, a copolymer of N-methyl methacrylimide and isobutyl methacrylate, a copolymer of N-methyl methacrylimide and phenyl methacrylate, a copolymer of N-ethyl methacrylimide and methyl methacrylate, and a copolymer of N-ethyl methacrylimide and ethyl methacrylate.

11. An intermediate transfer member in accordance with claim 1 wherein said polysulfone is represented by the following formulas/structures, wherein n is a number of from about 30 to about 5,000

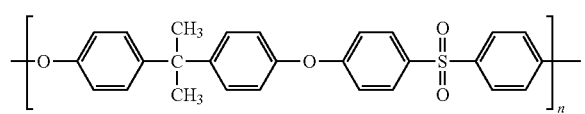

12. An intermediate transfer member in accordance with claim 11 where n is from about 200 to about 2,000.

13. An intermediate transfer member in accordance with claim 1 wherein said polyphenylsulfone is represented by the following formulas/structures, and wherein n is a number of from about 30 to about 5,000

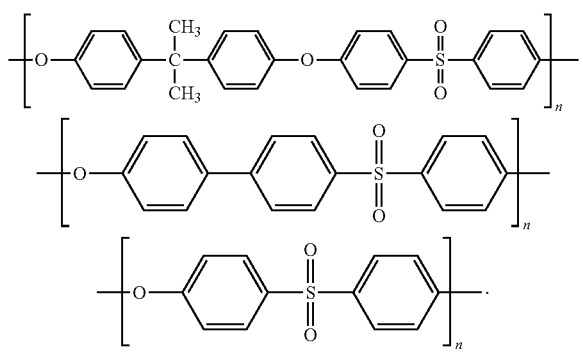

14. An intermediate transfer member in accordance with claim 13 where n is from about 200 to about 2,000.

15. An intermediate transfer member in accordance with claim 2 wherein the ratio of said polymethacrylimide to said polysulfone is from about 5/95 to about 20/80.

16. An intermediate transfer member in accordance with claim 3 wherein the ratio of said polymethacrylimide to said polyphenylsulfone is from about 5/95 to about 20/80.

17. An intermediate transfer member in accordance with claim 4 wherein the ratio of said polymethacrylimide to said polyethersulfone is from about 5/95 to about 20/80.

18. An intermediate transfer member in accordance with claim 1 further including in said blend a conductive component present in an amount of from about 1 to about 30 weight percent.

19. An intermediate transfer member in accordance with claim 18 wherein said conductive component is carbon black, a metal oxide, or a polyaniline.

20. An intermediate transfer member in accordance with claim 1 further including a supporting substrate comprised of a polyimide.

21. An intermediate transfer member in accordance with claim 1 further comprising an outer release layer positioned on said polymer blend, which blend is in the configuration of a layer and wherein said release layer comprises a fluorinated ethylene propylene copolymer, a polytetrafluoroethylene, a polyfluoroalkoxy polytetrafluoroethylene, a fluorosilicone, a terpolymer of vinylidene fluoride, hexafluoropropylene and tetrafluoroethylene, or mixtures thereof.

22. An intermediate transfer member comprised of a polymer mixture of a polymethacrylimide and a polysulfone, and which mixture includes therein a conductive component.

23. An intermediate transfer member in accordance with claim 22 wherein said conductive component is a carbon black present in an amount of from about 3 to about 30 weight percent, and wherein the ratio of said polymethacrylimide to said polysulfone is from about 5/95 to 20/80.

24. An intermediate transfer member comprised of a mixture of a polymethacrylimide, a polyphenylsulfone, and a conductive component, or a mixture of a polymethacrylimide, a polysulfone, and a conductive component.

25. An intermediate transfer member in accordance with claim 1 wherein said polyethersulfone is represented by the following formulas/structures, and wherein n is a number of from about 225 to about 2,000

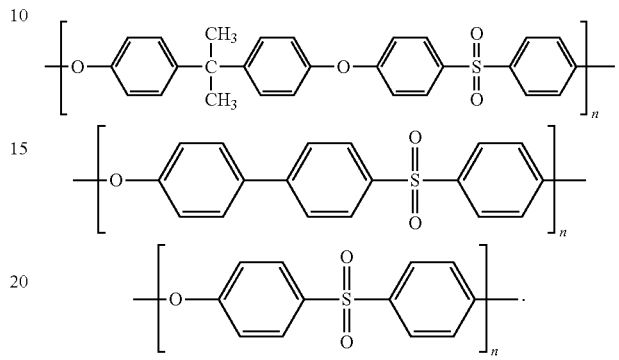

26. An intermediate transfer member in accordance with claim 1 wherein the ratio of said polymethacrylimide to said polysulfone is about 10/90; said polymethylacrylimide is (poly(N-methyl methacrylimide), with a number average molecular weight of from about 75,000 to about 125,000 and with a weight average molecular weight of from about 325,000 to about 375,000; said polysulfone has a number average molecular weight of from about 6,000 to about 12,000 and a weight average molecular weight of from about 25,000 to about 35,000; said polyphenylsulfone has a number average molecular weight of from about 9,000 to about 12,000 and a weight average molecular weight of from about 33,000 to about 39,000; and said polyethersulfone has a number average molecular weight of from about 12,000 to about 18,000 and a weight average molecular weight of from about 45,000 to about 55,000.

27. An intermediate transfer member in accordance with claim 26 wherein said polysulfone is represented by the following formulas/structures, wherein n is a number of from about 30 to about 5,000

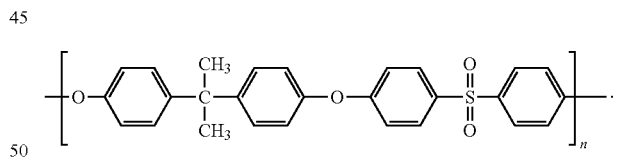

* * * * *